US006296791B1

United States Patent
Kobayashi et al.

(12)

(10) Patent No.: US 6,296,791 B1
(45) Date of Patent: Oct. 2, 2001

(54) PROCESS FOR PRODUCING MN-ZN FERRITE

(75) Inventors: Osamu Kobayashi; Osamu Yamada; Koji Honda; Shunji Kawasaki, all of Shizuokaeken (JP)

(73) Assignee: Minebea Co., Ltd., Asaba (JP)

( * ) Notice: Subject to any disclaimer, the term of this patent is extended or adjusted under 35 U.S.C. 154(b) by 0 days.

(21) Appl. No.: 09/541,985

(22) Filed: Apr. 3, 2000

(30) Foreign Application Priority Data

Apr. 5, 1999 (JP) .................................. 11-097677
Jan. 17, 2000 (JP) .................................. 12-007818

(51) Int. Cl.⁷ .................................................. C04B 35/38
(52) U.S. Cl. ...................... 264/37.3; 264/611; 264/612; 264/613; 264/37.1; 252/62.56; 252/62.59; 252/62.62
(58) Field of Search ..................... 264/611, 612, 264/613, 37.3, 37.1; 252/62.56, 62.59, 62.62

(56) References Cited

U.S. PATENT DOCUMENTS 4,097,392 * 6/1978 Goldman ............................. 264/613

4,963,281   10/1990   Togane .
5,846,448 * 12/1998   Yasuheva et al. ................ 252/62.56

FOREIGN PATENT DOCUMENTS

| 0 612 083 A1 | 8/1994 | (EP) . |
| 740755 | 11/1955 | (GB) . |
| 1472539 * | 5/1977 | (GB) . |
| A-5-198419 | 8/1993 | (JP) . |
| A-7-230909 | 8/1995 | (JP) . |
| A-10-208926 | 8/1998 | (JP) . |

* cited by examiner

Primary Examiner—James Derrington
(74) Attorney, Agent, or Firm—Oliff & Berridge, PLC

(57) ABSTRACT

A process for producing Mn—Zn ferrite is disclosed, which enables regeneration and reuse of scraps of a sintered product. The process comprises reusing a powder obtained by milling the sintered product of Mn—Zn ferrite, subjecting the powder to a component adjustment so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, and optionally 0.1 to 16.0 mol % of CuO, pressing the resulting mixed powder after the component adjustment, and then sintered a green compact.

2 Claims, No Drawings

PROCESS FOR PRODUCING MN-ZN FERRITE

BACKGROUND OF THE INVENTIONS

1. Field of the Invention

The present invention relates to a process for producing an oxide magnetic material having soft magnetism, particularly Mn—Zn ferrite. More particularly, the invention relates to a process for producing Mn—Zn ferrite which enables scraps of a sintered product to be regenerated and reused.

2. Description of the Related Art

There is Mn—Zn ferrite as a representative oxide magnetic material having soft magnetism. This Mn—Zn ferrite has conventionally widely been used as low loss materials used in switching power supply transformer, flyback transformer or deflection yoke, various inductance elements, impedance elements for EMI countermeasure, electromagnetic wave absorbers and the like. This Mn—Zn ferrite generally has a composition comprising basic components of more than 50 mol % of $Fe_2O_3$, 52 to 55 mol % of $Fe_2O_3$ on the average, 10 to 24 mol % of ZnO and the remainder being MnO. The Mn—Zn ferrite has conventionally been produced by mixing each raw material powder of $Fe_2O_3$, ZnO and MnO in predetermined proportion, forming the resulting mixture into a predetermined shape through each step of calcination, milling, component adjustment, granulation, pressing and the like, and then subjecting a green compact to sintering treatment such that the green compact is maintained at 1,200 to 1,400° C. for 3 to 4 hours in a reducing atmosphere having oxygen concentration greatly decreased by letting nitrogen gas flow.

The reason for sintering in a reducing atmosphere is that since the green compact contains $Fe_2O_3$ in a large amount of 50 mol % or more, if it is sintered in the air, densification does not proceed sufficiently, and as a result, good soft magnetism is not obtained. Further, $Fe^{2+}$ to be formed by reduction of $Fe^{3+}$ has a positive crystal magnetic anisotropy, and therefore has the effect that it offsets a negative crystal magnetic anisotropy of $Fe^{3+}$, thereby increasing soft magnetism. However, if sintered in the air, formation of $Fe^{2+}$ by such a reduction reaction cannot be expected. In the above described milling step, milling is conducted such that powder has an average particle size of about 1.0 to 1.4 $\mu$m. The reason for this is that if the average particle size is larger than 1.4 $\mu$m, the desired density is not obtained in sintering, and if the average particle size is smaller than 1.0 $\mu$m, it is difficult to handle the powder.

In the production of Mn—Zn ferrite as described above, many scraps are produced in each step for the reasons of a surplus of ferrite, defective ferrite or the like. Wastes produced in the steps before pressing have no specific problem on its regeneration utilization. However, regarding scraps of a sintered product due to defects such as dimensional defect, crack, breakage or the like in the sintering step, it is the trend that it is difficult to regenerate and reuse those for the reasons described hereinafter and those are disposed.

The reason why regeneration utilization of scraps of a sintered product is difficult is explained below.

The sintering step of Mn—Zn ferrite is rate-determined to a vacancy concentration of oxygen ion that has the slowest diffusion rate in the constituent ions. Factors which govern this are a content of $Fe_2O_3$ and an oxygen concentration in an atmosphere. Vacancy of oxygen ion tends to be easily formed as the $Fe_2O_3$ content is small and the oxygen concentration in an atmosphere is low. However, since the conventional Mn—Zn ferrite contains $Fe_2O_3$ in an amount of more than 50 mol %, vacancy of iron ion, manganese ion and zinc ion is largely formed corresponding to decrease in vacancy of oxygen ion. In other words, if it is intended to mill and press a sintered product of the conventional Mn—Zn ferrite for reuse, sintering must be conducted under the condition that oxygen concentration in an atmosphere is considerably lowered. However, the oxygen concentration which can be lowered in the actual mass-production step is at most about 0.1%, and the oxygen concentration in this degree can not secure the necessary vacancy concentration of oxygen ion. As a result, sintering does not proceed smoothly, making it difficult to obtain the desirable density of the ferrite.

SUMMARY OF THE INVENTION

The present invention has been made in view of the above-described problems in the prior art. An object of the present invention is to provide a process for producing Mn—Zn ferrite which enables regeneration and reuse of scraps of a sintered product without involving specific difficulty in sintering.

The above-described object can be achieved by the following embodiments of the present invention.

According to a first aspect of the present invention, there is provided a process for producing Mn—Zn ferrite, which comprises reusing a powder obtained by milling a sintered product of Mn—Zn ferrite, subjecting the powder to a component adjustment so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, pressing the resulting mixed powder after the component adjustment, and then sintering the green compact.

According to a second aspect of the present invention, there is provided a process for producing Mn—Zn ferrite, which comprises reusing a powder obtained by milling a sintered product of Mn—Zn ferrite, subjecting the powder to a component adjustment so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO, and the remainder being MnO, pressing the resulting mixed powder after the component adjustment, and then sintering the green compact.

DETAILED DESCRIPTION OF PREFERRED EMBODIMENTS

In first and second aspects of the present invention, the amount of the powder for reuse, i.e., regenerated power to be used is optional, and if the powder has the objective composition of components as it is, the entire amount of the mixed powder for pressing may be used as the regenerated powder. In the case that the regenerated powder alone does not have the objective composition of components, the component adjustment is of course conducted by adding an appropriate amount of each raw material powder of $Fe_2O_3$, ZnO, $TiO_2$, $SnO_2$, CuO, MnO and the like. Further, an average particle size of the regenerated powder is desirably restricted to about 1.0 $\mu$m in its lower limit as the same as in the conventional one, but the upper limit thereof may be a value exceeding 1.4 $\mu$m, for example about 2.0 $\mu$m.

The first and second aspects of the present invention restrict the $Fe_2O_3$ content to 50 mol % less as described above. Therefore, even if a regenerated powder is used, vacancy of oxygen ion tends to be easily formed in the course of sintering, and even if the powder is sintered (heated-maintained-cooled) in the air or an atmosphere containing a certain amount of oxygen, a density thereof sufficiently increases. However, since too small $Fe_2O_3$ content causes to invite a decrease in an initial permeability, $Fe_2O_3$ should be contained in an amount of at least 44.0 mol %.

It is known that Ti and Sn receive an electron from $Fe^{2+}$, thereby $Fe^{3+}$ is formed. Therefore, by containing Ti and Sn, $Fe^{2+}$ can be formed even by sintering the powder in the air or an atmosphere containing a certain amount of oxygen. In the first and second aspects of the present invention, it is made possible to obtain good soft magnetism by that the content of $TiO_2$ and/or $SnO_2$ in the composition of the basic components is adjusted to 0.1 to 8.0 mol % to control the amount of $Fe^{2+}$ to be formed, thereby optimizing an existence ratio of $Fe^{3+}$ and $Fe^{2+}$ in order to cancel out positive and negative crystal magnetic anisotropy. However, if the content of $TiO_2$ and/or $SnO_2$ is less than 0.1 mol %, its effect is small. On the other hand, if the content is larger than 8.0 mol %, the initial permeability decreases. For this reason, the content of $TiO_2$ and/or $SnO_2$ is limited to the above described range of 0.1 to 8.0 mol %.

ZnO affects Curie temperature or saturation magnetization. If the ZnO content is too large, the Curie temperature lowers, resulting in practical problem. On the other hand, if the ZnO content is too small, saturation magnetization decreases. For this reason, the ZnO content is desirably limited to the above described range of 4.0 to 26.5 mol %.

The second aspect of the present invention contains CuO as described above. The CuO has the effect which enables low temperature sintering. However, if the CuO content is too small, the above-mentioned effect is small, and on the other hand, if the content is too large, initial permeability decreases. For this reason, the CuO content is desirably limited to the above described range of 0.1 to 16.0 mol %.

The first and second aspects of the present invention can contain a slight amount of at least one member selected from the group consisting of CaO, $SiO_2$, $ZrO_2$, $Ta_2O_3$, $HfO_2$, $Nb_2O_3$ and $Y_2O_2$ as the additives. Those additives have the effect to make resistance of crystal grain boundary high.

Further, at least one member selected from the group consisting of $V_2O_2$, $Bi_2O_3$, $In_2O_3$, PbO, $MoO_3$ and $WO_2$ can also be contained as the additives. Those additives are an oxide having low melting point, and have the function to accelerate sintering.

In addition, at least one member selected from the group consisting of $Cr_2O_3$ and $Al_2O_3$ may also be contained as the additives. Those additives have the effect to improve temperature characteristics of initial permeability.

In producing Mn—Zn ferrite, scraps of a sintered product of Mn—Zn ferrite formed in a sintering step are milled using an appropriate milling means, for example, a hammer mill and a jet mill, to form a regenerated powder, each raw material powder such as $Fe_2O_3$, ZnO, $TiO_2$ and/or $SnO_2$, CuO, MnO as main components is mixed with the regenerated powder in the predetermined proportion, thereby obtaining a mixed powder having the objective composition of components. It is not necessary for the regenerated powder to be previously prepared in a fine size, but it is sufficient for the regenerated powder to have a particle size of about 40 µm or less. In this case, the mixed powder is calcined and then finely milled to a particle size of about 2.0 µm or less. The calcination temperature in this case is appropriately selected within a temperature range of 850 to 950° C., although more or less varying depending on the objective composition. General-purpose ball mill can be used to finely mill the mixed powder. If desired and necessary, powder of the above-described various additives is added to the fine mixed powder in the predetermined proportion to obtain a mixed powder having the objective composition of components. Subsequently, granulation and pressing are conducted according to the conventional process for producing ferrite, and sintering treatment is conducted such that it is maintained at 1,000 to 1,300° C. for 2 to 4 hours. The sintering (heated-maintained-cooled) may be conducted in the air or an atmosphere containing oxygen at a concentration of, for example, about 0.1%. If the sintering is conducted in an atmosphere containing oxygen, it is desirable to control oxygen concentration by letting an inert gas flow such as nitrogen gas in a sintering furnace.

The present invention is described in more detail by referring to the following examples, but the invention should not be limited thereto.

EXAMPLE 1

Each raw material powder was mixed with a ball mill so as to obtain a composition that $Fe_2O_3$ was 52.5 mol %, MnO was 24.2 mol % and ZnO was 23.3 mol %. After that, the resulting mixture was calcined at 900° C. for 2 hours in the air, and then milled with a ball mill for 20 hours to obtain a mixed powder having an average particle size of 1.2 µm. Next, CaO was added as an additive to the mixed powder in an amount of 0.05 mass %, followed by mixing with a ball mill for 1 hour. Polyvinyl alcohol was added to the mixed powder, and the resulting mixture was granulated, and then pressed into a toroidal core (green compact) having an outer diameter of 18 mm, an inner diameter of 10 mm and a height of 4 mm under a pressure of 80 MPa. After that, the green compact was introduced into a sintering furnace, and was subjected to sintering treatment by maintaining the same at 1,300° C. for 3 hours and cooling after sintering in an atmosphere in which oxygen concentration was decreased to 0.1% by letting nitrogen gas flow, thereby obtaining a sintered product (Comparison Sample) 1-1 which was the same as the conventional Mn—Zn ferrite.

Next, the sintered product 1-1 obtained above was milled using a hammer mill and a jet mill such that the resulting powder had an average particle size of 40 µm or less, and this powder was used as a regenerated powder. After that, the regenerated powder was mixed with a ball mill for 1 hour, and polyvinyl alcohol was added thereto. The resulting mixture was granulated and pressed into a toroidal core having an outer diameter of 18 mm, an inner diameter of 10 mm and height of 4 mm under a pressure of 80 MPa. Then the green compact was introduced into a sintering furnace, and was subjected to sintering treatment by maintaining the same at 1,300° C. for 3 hours and cooling after sintering in an atmosphere in which oxygen concentration was decreased to 0.1% by letting nitrogen gas flow, thereby obtaining a regenerated sintered product (Comparison Sample) 1-2 which has the same components and composition as in the conventional Mn—Zn ferrite.

On the other hand, Comparison Sample 1-1 obtained above was milled using a hammer mill and a jet mill such that the resulting powder had an average particle size of 40 µm or less, and this powder was used as a regenerated powder. Necessary raw materials were added to the powder, and component adjustment was conducted such that $Fe_2O_3$ was 48.0 mol %, $TiO_2$ or $SnO_2$ was 2.0 mol %, and the remainder was MnO and ZnO in a molar ratio of 26:25. The mixture was mixed with a ball mill, calcined at 900° C. for 2 hours in the air, and then was milled with a ball mill to obtain a mixed powder having an average particle size of 1.2 µm and 2.0 µm. Next, polyvinyl alcohol was added to the mixed powder. The resulting mixture was granulated and pressed into a toroidal core (green compact) having an outer diameter of 18 mm, an inner diameter of 10 mm and a height of 4 mm under a pressure of 80 MPa. The green compact was introduced into a sintering furnace, and was subjected to sintering treatment by maintaining the same at 1,300° C. for 3 hours and cooling after sintering in the air or in an atmosphere in which oxygen concentration was decreased to 0.1% by letting nitrogen gas flow, thereby obtaining regenerated sintered products (Samples of the present invention) 1-3 to 1-7.

On each of Samples 1-1 to 1-7 obtained above, final components were confirmed by a fluorescent X-ray analysis, and sintered density and initial permeability at 1 MHz were measured. The results obtained are shown in Table 1 below.

compact was introduced into a sintering furnace, and was sintered and cooled after sintering at 900 to 1,300° C. for 3

TABLE 1

| Sample No. | Classific- cation | Basic component composition (mol %) | | | | | Average particle size ($\mu$m) | Sintering atmosphere | Sintered density (kg/m$^3$) | Initial permeability at 1 MHz |
|---|---|---|---|---|---|---|---|---|---|---|
| | | $Fe_2O_3$ | MnO | ZnO | $TiO_2$ | $SnO_2$ | | | | |
| 1-1 | Comparison | 52.5 | 24.2 | 23.3 | — | — | 1.2 | 0.1% $O_2$ | 4.97 × 10$^3$ | 1510 |
| 1-2 | Comparison | 52.5 | 24.2 | 23.3 | — | — | 1.2 | 0.1% $O_2$ | 4.46 × 10$^3$ | 720 |
| 1-3 | Invention | 48.0 | 25.5 | 24.5 | 2.0 | — | 1.2 | Air | 4.95 × 10$^3$ | 1530 |
| 1-4 | Invention | 48.0 | 25.5 | 24.5 | 2.0 | — | 2.0 | Air | 4.89 × 10$^3$ | 1500 |
| 1-5 | Invention | 48.0 | 25.5 | 24.5 | — | 2.0 | 2.0 | Air | 4.90 × 10$^3$ | 1520 |
| 1-6 | Inventiom | 48.0 | 25.5 | 24.5 | 2.0 | — | 1.2 | 0.1% $O_2$ | 4.99 × 10$^3$ | 1600 |
| 1-7 | Invention | 48.0 | 25.5 | 24.5 | 2.0 | — | 2.0 | 0.1% $O_2$ | 4.96 × 10$^3$ | 1550 |

From the results shown in Table 1 above, Comparison Sample 1-2 which is a regenerated sintered product having the same components and composition as the conventional Mn—Zn ferrite has low density and also largely decreased initial permeability, as compared with Comparison Sample 1-1 of the original (non-regenerated sintered product), and is therefore not durable to practical use. Contrary to this, Samples 1-3 to 1-7 of the present invention have substanhours in the air, thereby obtaining Samples 2-1 to 2-4 as regenerated sintered products.

On each of Samples 2-1 to 2-4 obtained above, final components were confirmed by a fluorescent X-ray analysis, and initial permeability at 1 MHz was measured. The results obtained are shown in Table 2 below.

TABLE 2

| Sample No. | Classifi- cation | Basic component composition (mol %) | | | | | Initial permeability at each sintering temperature | | | | |
|---|---|---|---|---|---|---|---|---|---|---|---|
| | | $Fe_2O_3$ | MnO | ZnO | $TiO_2$ | CuO | 1300° C. | 1200° C. | 1100° C. | 1000° C. | 900° C. |
| 2-1 | Invention | 48.0 | 25.5 | 24.5 | 2.0 | 0 | 1530 | 990 | 510 | 200 | 80 |
| 2-2 | Invention | 48.0 | 21.4 | 20.6 | 2.0 | 8.0 | 960 | 1060 | 1540 | 1120 | 840 |
| 2-3 | Invention | 48.0 | 17.3 | 16.7 | 2.0 | 16.0 | 620 | 820 | 1030 | 1520 | 1180 |
| 2-4 | Comparison | 48.0 | 15.3 | 14.7 | 2.0 | 20.0 | 410 | 620 | 670 | 750 | 720 | tially the same density and initial permeability as in Comparison Sample 1-1 of the original, despite that those are the same regenerated sintered product. It is therefore apparent that the production process of the present invention greatly contributes to regeneration and reuse of a sintered product. Further, in Samples of the present invention, no substantial difference is recognized in density and initial permeability between Samples 1-3 to 1-5 for which sintering was conducted in the air and Samples 1-6 and 1-7 for which sintering was conducted in an atmosphere having an oxygen concentration decreased to 0.1%. Therefore, it becomes clear that there is no problem even if sintering is conducted in the air.

EXAMPLE 2

Comparison Sample 1-1 obtained in Example 1 was milled using a hammer mill and jet mill such that the resulting powder had an average particle size of 40 $\mu$m or less, and this powder was used as a regenerated powder. Necessary raw materials were added to the powder, and component adjustment was conducted such that $Fe_2O_3$ was 48.0 mol %, $TiO_2$ was 2.0 mol %, CuO was 0–20.0 mol % and the remainder was MnO and ZnO in a molar ratio of 26:25. The mixture was mixed with a ball mill, calcined at 850° C. for 2 hours in the air, and then was milled with a ball mill to obtain a mixed powder having an average particle size of 2.0 $\mu$m. Next, polyvinyl alcohol was added to the mixed powder. The resulting mixture was granulated and pressed into a toroidal core (green compact) having an outer diameter of 18 mm, an inner diameter of 10 mm and a height of 4 mm under a pressure of 80 MPa. After that, the green From the results shown in Table 2 above, in Sample 2-1 (Sample of the present invention) which does not contain CuO at all, the sintering temperature must be set to high temperature of 1,300° C. or higher in order to obtain high initial permeability of 1,000 or more, but Samples 2-2 and 2-3 (Samples of the present invention) which contain an appropriate amount of CuO can obtain high initial permeability of 1,000 or more even though the sintering temperature is set as low as about 1,000° C. However, it is impossible for Sample 2-4 (Comparison Sample) which contains relatively large amount of CuO (20.0 mol %) to obtain high permeability of 1,000 or more regardless of the sintering temperature. Thus, it becomes apparent that the presence of CuO in an appropriate amount is effective to lower the sintering temperature and to improve initial permeability at high frequency region.

EXAMPLE 3

Comparison Sample 1-1 obtained in Example 1 was milled using a hammer mill and a jet mill such that the resulting powder had an average particle size of 40 $\mu$m or less, and this powder was used as a regenerated powder. Then necessary raw materials were added to the powder, and component adjustment was conducted such that $Fe_2O_3$ was 48.0 mol %, $TiO_2$ was 2.0 mol % and the remainder was MnO and ZnO in a molar ratio of 26:25. Thereafter, the mixture was mixed with a ball mill, calcined at 900° C. for 2 hours in the air, and then was milled with a ball mill to obtain a mixed powder having an average particle size of 2.0 $\mu$m. Then 0.05 mass % of $MoO_3$, 0.10 mass % of $ZrO_2$ or 0.15 mass % of $Al_2O_3$ was added to the mixed powder as an accessory component, and the resulting mixed powder was milled with a ball mill for 1 hour. Polyvinyl alcohol was added to the mixed powder. The resulting mixture was granulated and pressed into a toroidal core (green compact) having an outer diameter of 18 mm, an inner diameter of 10 mm and a height of 4 mm under a pressure of 80 MPa. The green compact was introduced into a sintering furnace, and was sintered and cooled after sintering at 900 to 1,300° C. for 3 hours in the air, thereby obtaining Samples 3-1 to 3-3 (Samples of the present invention) as regenerated sintered products.

On each of Samples 3-1 to 3-3 obtained above, final components were confirmed by a fluorescent X-ray analysis, and sintered density and initial permeability at 1 MHz were measured. The results obtained are shown in Table 3 below.

TABLE 3

| Sample No. | Classification | Basic component composition (mol %) | | | | Additive (mass %) | Average particle size ($\mu$m) | Sintered density (kg/m$^3$) | Initial permeability at 1 MHz |
| --- | --- | --- | --- | --- | --- | --- | --- | --- | --- |
| | | $Fe_2O_3$ | MnO | ZnO | $TiO_2$ | | | | |
| 3-1 | Invention | 49.0 | 25.5 | 24.5 | 2.0 | $MoO_3$ 0.05 | 2.0 | 4.98 × 10$^3$ | 1530 |
| 3-2 | Invention | 49.0 | 25.5 | 24.5 | 2.0 | $ZrO_2$ 0.10 | 2.0 | 4.94 × 10$^3$ | 1550 |
| 3-3 | Invention | 49.0 | 25.5 | 21.5 | 2.0 | $Al_2O_3$ 0.15 | 2.0 | 4.92 × 10$^3$ | 1520 |

From the results shown in Table 3 above, it is apparent that high density and high initial permeability can be also obtained when $MoO_3$, $ZrO_2$ or $Al_2O_3$ is added in slight amount as an accessory component.

As described above, according to the process for producing Mn—Zn ferrite according to the present invention, sufficiently high density of a sintered product and soft magnetism can be obtained even if scraps of a sintered product are regenerated and reused. Also, not only sintering (heated-maintained-cooled) can be conducted in the air, but it is not necessary to finely mill the regenerated powder so much. Thus, the present invention establishes regeneration and reuse technique having excellent productivity and large merit on cost.

What is claimed is:

1. A process for producing Mn—Zn ferrite, which comprises reusing a powder obtained by milling a sintered product of Mn—Zn ferrite, subjecting the powder to a component adjustment so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, and the remainder being MnO, pressing the resulting mixed powder after the component adjustment to form a green compact, and then sintering the green compact.

2. A process for producing Mn—Zn ferrite, which comprises reusing a powder obtained by milling a sintered product of Mn—Zn ferrite, subjecting the powder to a component adjustment so as to have a composition of 44.0 to 50.0 mol % of $Fe_2O_3$, 4.0 to 26.5 mol % of ZnO, 0.1 to 8.0 mol % of at least one member selected from the group consisting of $TiO_2$ and $SnO_2$, 0.1 to 16.0 mol % of CuO, and the remainder being MnO, pressing the resulting mixed powder after the component adjustment to form a green compact, and then sintering the green compact.

* * * * *